PROCESS FOR PREPARING OZINES
Filed April 9, 1971
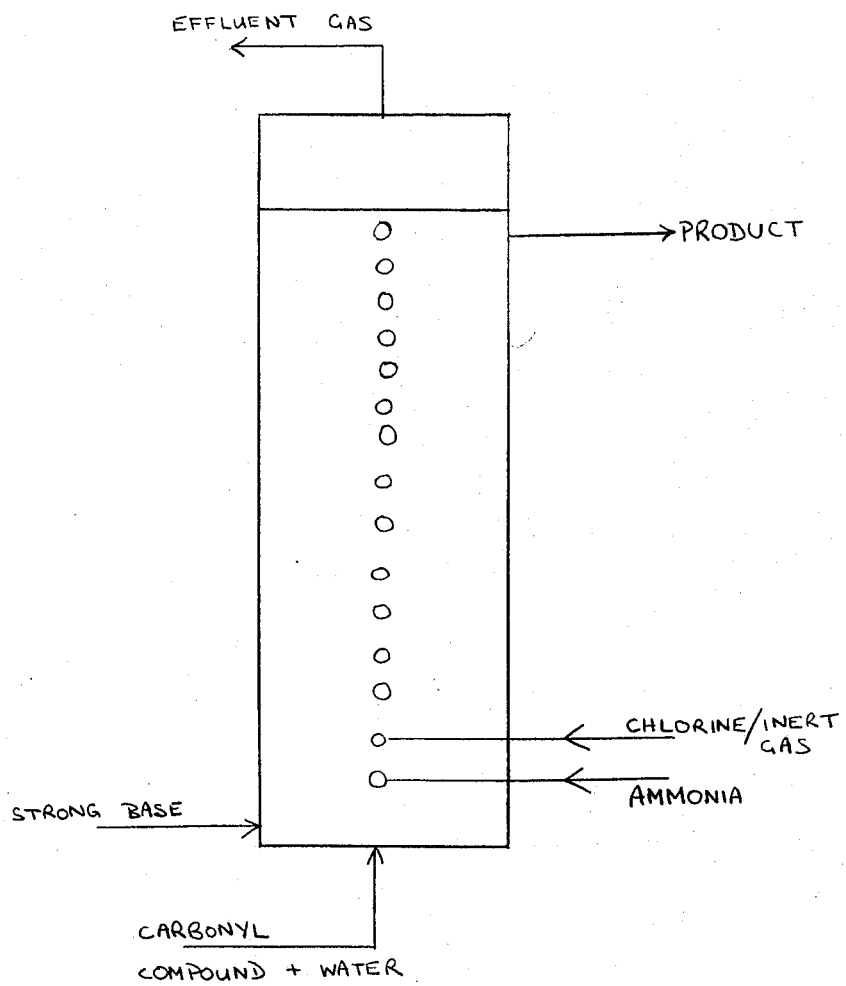

United States Patent Office 3,773,831
Patented Nov. 20, 1973

3,773,831
PROCESS FOR PREPARING AZINES
Godfrey Vaughan Jeffreys, Sutton Coldfield, and Colin Elliott Marks, Quorn, England, assignors to Fisons Limited, Suffolk, England
Filed Apr. 9, 1971, Ser. No. 132,740
Claims priority, application Great Britain, Apr. 10, 1970, 17,084/70
Int. Cl. C07c *119/00*
U.S. Cl. 260—566 B                    11 Claims

ABSTRACT OF THE DISCLOSURE

Azines are prepared by reacting chlorine, diluted with an inert gas, with a reaction mixture containing ammonia, a carbonyl compound and a strong base, the reaction mixture being subjected to no appreciable deliberate agitation during the reaction.

---

The present invention relates to a process for the production of azines.

Azines have found considerable use in the production of hydrazine which they form on hydrolysis.

In the preparation of azines it has been proposed to form chloramine in situ in a reaction mixture comprising a suitable carbonyl compound and ammonia by passing a stream of chlorine gas into the reaction mixture. Hitherto it has been considered necessary to agitate the reaction mixture thoroughly in order to achieve uniform distribution of the chloramine throughout the reaction mixture.

We have now found that it is not necessary to agitate the reaction mixture and that as a result problems associated with scale-up of a process involving vigorous agitation can be avoided. We have also surprisingly found that with the process of the invention it is possible to reduce the amount of base required during the production of azines to below the 2 molar proportions or more of base per molar proportion of chlorine hitherto considered necessary to ensure the production of azines.

Accordingly, the present invention relates to a process for preparing azines which comprises passing a gas comprising free chlorine and an inert gas through a reaction mixture containing ammonia, a carbonyl compound and a strong base, the reaction mixture being subjected to no appreciable deliberate agitation during the reaction.

The term deliberate agitation is used herein to denote agitation which is carried out intentionally by an operator of the process. It does not include the agitation which occurs as a necessary consequence of passing gas through a reaction mixture or of causing the reaction mixture to flow through a vessel. The term incidental agitation will be used to denote such agitation as may arise as a consequence of the operation of the steps of the process.

Desirably the process of the invention is carried out merely by passing the chlorine-containing gas through the reaction mixture which is not being subjected to deliberate agitation.

During the process of the invention the following reactions take place:

(i) $Cl_2 + 2NH_3 \longrightarrow NH_4Cl + NH_2Cl$ (ii) $NH_2Cl + NH_3 + NaOH \longrightarrow N_2H_4 + NaCl + H_2O$ (iii) 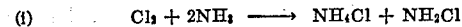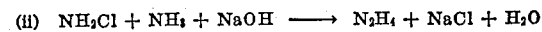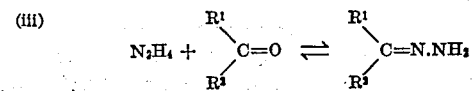

$$N_2H_4 + \underset{R^2}{\overset{R^1}{>}}C=O \rightleftharpoons \underset{R^2}{\overset{R^1}{>}}C=N.NH_2$$

(iv)
$$\underset{R^2}{\overset{R^1}{>}}C=N.NH_2 + \underset{R^3}{\overset{R^1}{>}}C=O \rightleftharpoons \underset{R^2}{\overset{R^1}{>}}C=N-N=C\underset{R^3}{\overset{R^1}{<}} + H_2O$$

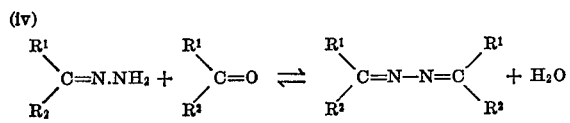

Reaction (i) takes place within the gas phase of the bubbles as they pass through the reaction mixture, the other reactions take place in the liquid phase after the chloramine has diffused out of the bubbles.

The inert gas/chlorine mixture may contain a wide range of proportions of inert gas to chlorine. In general it is preferable to use gas mixtures containing more than 0.5% but less than 10%, preferably less than 5%, ideally about 2%, by volume of chlorine. The inert gas in the mixture may be any gas which does not react to any appreciable extent under the conditions of the process. Suitable inert gases include gases of Group VIII-A of the Periodic Table, nitrogen and (preferably) air.

The carbonyl compounds for present use include ketones and aldehydes which may have the general formula:

$$\underset{R^2}{\overset{R^1}{>}}C=O$$

wherein $R^1$ is an alkyl group, e.g. an alkyl group containing from 1 to 6 carbon atoms, or an aryl group; and $R^2$ is hydrogen, alkyl, e.g. an alkyl group containing from 1 to 6 carbon atoms, or an aryl group, or together with $R^1$ and the $>C=O$ group forms a cycloaliphatic ketone. Specific examples of suitable carbonyl compounds include acetaldehyde, propionaldehyde, benzaldehyde, acetone, diethylketone, methylethylketone, methylisobutylketone, acetophenone and cyclohexanone. Preferred carbonyl compounds for present use are acetone and methylethylketone.

The reaction mixture in which the reactions are carried out may comprise an excess of the carbonyl compound. Water is produced during the process of the invention, and the reaction medium may contain water which may be present in from 1 to 97%, e.g. from 10 to 97%, by weight of the reaction medium.

The reaction medium may exist as either a two phase or a single phase system. If desired, an additive, such as a lower alcohol, may be added to a two phase system in order to obtain a single phase reaction medium.

The reaction mixture also contains ammonia and this conveniently takes the form of ammonia dissolved in the reaction medium. Desirably the reaction medium contains as high a concentration of ammonia as possible and ammonia gas is desirably passed into the reaction mixture in order to maintain the concentration of ammonia at as near saturation as possible.

The process of the invention may be carried out merely by bubbling the chlorine-containing gas through the reaction medium in which the ammonia is dissolved. During its passage through the reaction mixture the chlorine in the bubble reacts with the ammonia in a gas phase reaction to form chloramine which then diffuses into the reaction mixture to initiate a series of reactions leading to the production of the azine. The formation of the chloramine and its diffusion into the reaction mixture are usually completed within about 1 second and desirably a gas residence time in the reaction mixture of at least 1 second is provided.

As indicated above, ammonia gas may also be fed into the reaction mixture. The purpose of this is to replace ammonia consumed during the process of the invention and to maintain as high a concentration as possible of ammonia in the reaction mixture. While the whole of the reaction mixture may be maintained at near saturation with ammonia, it is preferred to add ammonia gas at or near the point of entry of the chlorine-containing gas so as to obtain a high local concentration of ammonia at this point, even though the rest of the reaction mixture may not be saturated with ammonia. This high local concentration may be achieved by injecting ammonia gas into the reaction mixture just below, say 1 to 5 cm. below, the point of entry of the chlorine-containing gas. Alternatively, the ammonia gas and the chlorine-containing gas may be fed down concentric tubes to form bubbles containing the gases at a twin nozzle. In this latter case it will be appreciated that the ammonia does not need to diffuse into the chlorine bubbles before reaction can take place.

Theoretically, 3 mols of ammonia are required during the production of one mol of azine from one mol of chlorine. However, it is desirable that the ammonia to chlorine molar ratio is above 10:1, preferably within the range 15:1 to 20:1.

The theoretical amount of carbonyl compound required to react with the hydrazine produced from one mol of chlorine is 2 mols. For continuous operation in an aqueous medium it is preferred to use 3–5 mols of carbonyl compound per mol of chlorine; but for batch operation this may be reduced to 2 mols per mol of chlorine. However, a large excess of carbonyl compound may be used if desired, as is the case where the reaction medium is provided by the carbonyl compound. With an excess of carbonyl compound, saturation of the reaction medium with ammonia will usually ensure that an adequate excess of ammonia is also present at all times.

At least one molar proportion of strong base is required for each mol of chlorine gas fed into the reaction system. It is desirable also to provide sufficient strong base to neutralise the ammonia chloride produced. Since the use of excessive amounts of strong base may result in decomposition of the chloramine, the amount of strong base is preferably below two molar proportions. Thus from 1.2 to 2.0 mols of base may be used per mol of chlorine. The amount of base required to neutralise the ammonium chloride which dissolves in the reaction mixture may be correlated to the pH of the reaction mixture at a given temperature, and ammonia concentration and measurement of pH thus offers a convenient method for monitoring the amount of base required. Thus at a temperature of about 55° C. and an ammonia concentration of 7% by weight, the pH of the reaction mixture may be from 10.0 to 12.5, and is preferably 11.0 to 11.5. It should be noted that, whereas in earlier processes with vigorous agitation substantially all the ammonium chloride formed was dissolved in the reaction mixture, we have found that in the absence of deliberate agitation a substantial proportion of the ammonium chloride is entrained in the gas bubbles and removed from the reaction system.

The strong base is a base which is capable of neutralising ammonium chloride. Suitable strong bases include alkali-metal and alkaline-earth metal hydroxides, e.g. calcium, magnesium, potassium or sodium hydroxide; and quaternary bases such as anion exchange resins, tetramethylammonium hydroxide, benzyltrimethylammonium hydroxide and the like. For reasons of economy, sodium hydroxide or calcium hydroxide are generally the preferred bases. The strong base may be present ab initio in the reaction mixture, but is preferably added at an appropriate rate simultaneously with the chlorine-containing gas. Desirably the strong base is added as an aqueous solution.

The process of the invention may be carried out as a batch process, in which case the proportions of base, ammonia and carbonyl compound are related to the total amount of chlorine to be fed to the reaction mixture; or as a continuous process where the proportions are related to the rate of flow of the various reactants through the reaction system. While diffusion of ammonia into the chlorine-containing gas bubbles, the formation of the chloramine and its diffusion into the liquid phase may occur comparatively quickly, the reactions initiated in the liquid phase by the chloramine may require a longer period to proceed to completion. It is therefore desired that the liquid phase have a comparatively long reaction time before being treated further, e.g. from 10 to 20 minutes. It will be appreciated that longer reaction times than these may be used if desired and that not all the reaction need take place in a single reaction vessel but that after an initial contact stage between the liquid phase and chlorine-containing gas, the liquid phase may be passed to one or more other vessels in which reaction is completed.

As indicated above, the process of the invention is carried out by passing the chlorine-containing gas, optionally also ammonia gas and strong base, into a reaction medium containing a carbonyl compound and ammonia. The passing of the gas mixture and the subsequent reactions may be carried out at any temperature up to the boiling point of the liquid phase, preferably at from 15° to 55° C. If desired the addition of the gas and the subsequent reactions may be carried out under pressure, e.g. at up to 20 atmospheres gauge, but this is not generally necessary.

The product of the process of the invention may be recovered from the reaction mixture and purified if desired by conventional techniques. Residual reactants and by-products may be recovered and re-used if desired.

The process will now be illustrated by way of example with reference to the accompanying drawing which is a diagrammatic view of a suitable reaction vessel.

The reaction vessel comprises a vertical closed cylindrical glass tower. The base of the tower is provided with an inlet for the reactant carbonyl compound/water mixture. In the basal portion of the tower are provided an inlet for strong aqueous base, a nozzle for gaseous ammonia and a nozzle for the inert gas/chlorine mixture, these nozzles being positioned along the axis of the tower in the order given. Near the top of the tower is a product outlet and the top closed end is provided with a gas effluent pipe.

EXAMPLE

A solution of methylethylketone 10% w./w. in water is pumped to a tower, as described above, 6 inches in diameter and 12 inches high, at a rate of 18 litres/hour. This gives a liquid residence time of about 20 minutes. The temperature of the solution in the tower is maintained at 55° C.

Once the tower is filled with solution, ammonia gas is passed through at a rate sufficient to ensure saturation of the solution. At 55° C. it has been found that an ammonia feed rate of 7% w./w. based on the water input to the tower is satisfactory.

Chlorine is then fed to the tower as a mixture of 98% v./v. nitrogen and 2% v./v. chlorine at a total gas rate of 1120 litres/hr. Simultaneously aqueous sodium hydroxide (5% w./w. NaOH) is fed to the tower at a rate equivalent to 1.5 mols sodium hydroxide per mol of chlorine feed.

Under these conditions the overall yield of methylethyl ketone azine was 96% based on the chlorine feed to the tower. No stirrer or other agitation was used.

We claim:

1. In a process for preparing azines which comprises passing a gas mixture containing free chlorine and an inert gas through an aqueous reaction mixture formed from ammonia, a strong base, and a carbonyl compound of the formula

wherein $R^1$ is alkyl of 1 to 6 carbon atoms or phenyl and $R^2$ is hydrogen, alkyl of 1 to 6 carbon atoms or phenyl, or $R^1$ and $R^2$ together with the carbonyl group form a cycloaliphatic ketone, the improvement wherein the only substantial agitation of the reaction mixture is caused by the passage of the gas mixture.

2. A process according to claim 1 wherein the inert gas is selected from gases of Group VIII-A of the Periodic Table, nitrogen and air.

3. A process according to claim 1 wherein the carbonyl compound is selected from acetaldehyde, propionaldehyde, benzaldehyde, methyl ethyl ketone, diethylketone, methyl isobutyl ketone, acetophenone, cyclohexanone and acetone.

4. A process according to claim 1 wherein the reaction mixture comprises an excess of the carbonyl compound.

5. A process according to claim 1 wherein the reaction medium contains 1 to 97% by weight of water.

6. A process according to claim 1 wherein the residence time of the gas in the reaction mixture is at least 1 second.

7. A process according to claim 1 wherein ammonia gas is fed to the reaction mixture at a point adjacent to the point of entry of the gas mixture.

8. A process according to claim 1 wherein the molar ratio of ammonia to chlorine is greater than 10:1 and less than 20:1.

9. A process according to claim 1 wherein the strong base is selected from alkali metal hydroxides, alkaline earth metal hydroxides, and quaternary ammonium bases.

10. A process according to claim 9 wherein the strong base is selected from sodium hydroxide and calcium hydroxide.

11. A process according to claim 1 wherein the reaction is carried out at a temperature of 15° to 55° C.

References Cited
UNITED STATES PATENTS

| | | | |
|---|---|---|---|
| 3,415,882 | 12/1968 | Jenkins et al. | 260—566 B |
| 3,382,041 | 5/1968 | Needham et al. | 260—566 B X |
| 3,527,753 | 9/1970 | Needham et al. | 260—566 B |

FOREIGN PATENTS

| | | | |
|---|---|---|---|
| 507,392 | 11/1954 | Canada | 23—190 R |

HOWARD T. MARS, Primary Examiner

M. W. GLYNN, Assistant Examiner

U.S. Cl. X.R.

23—190 R